United States Patent [19]

Markusch et al.

[11] Patent Number: 5,221,710

[45] Date of Patent: Jun. 22, 1993

[54] PROCESS FOR PREPARING AND OPTIONALLY CHAIN EXTENDING AQUEOUS POLYISOCYANATE DISPERSIONS USING STATIC MIXERS

[75] Inventors: Peter H. Markusch, McMurray, Pa.; Arthur W. Mason, Sisterville; Robin E. Tirpak, Wheeling, both of W. Va.

[73] Assignee: Miles Inc., Pittsburgh, Pa.

[21] Appl. No.: 677,002

[22] Filed: Mar. 28, 1991

[51] Int. Cl.$^5$ .......................... C08J 3/00; C08K 3/20; C08L 75/00; C08G 18/32
[52] U.S. Cl. ..................................... 524/591; 524/839; 528/68
[58] Field of Search ................... 524/591, 839; 528/68

[56] References Cited

U.S. PATENT DOCUMENTS

| | | | |
|---|---|---|---|
| 3,953,393 | 4/1976 | Ramlow et al. | 528/67 |
| 4,472,550 | 9/1984 | Reiff et al. | 524/591 |
| 4,879,322 | 11/1989 | Markusch et al. | 524/839 |
| 4,904,522 | 2/1990 | Markusch | 428/288 |
| 5,043,381 | 9/1989 | Coogan et al. | 524/591 |

Primary Examiner—Paul R. Michl
Assistant Examiner—Patrick Niland
Attorney, Agent, or Firm—Joseph C. Gil; Thomas W. Roy

[57] ABSTRACT

The present invention is directed to a process for preparing an aqueous polyisocyanate dispersion which has an isocyanate content of at least 0.5% by weight by
a) introducing an aqueous medium into a static mixer,
b) introducing a polyisocyanate into the static mixer,
c) mixing the polyisocyanate with the aqueous medium in the static mixer and
d) withdrawing the aqueous polyisocyanate dispersion from the outlet of the static mixer,
e) introducing the aqueous polyisocyanate dispersion into the inlet of a second static mixer,
f) introducing into the same of a different inlet of the second static mixer a chain extender containing at least a primary or secondary hydroxy monoamine and/or a polyamine having primary and/or a polyamine having primary and/or secondary amino groups
g) mixing the chain extender with the aqueous polyisocyanate dispersion in the second static mixer,
h) withdrawing the reacting mixture of the aqueous polyisocyanate dispersion and the chain extender from the outlet of the second static mixer and
i) allowing the polyisocyanate and chain extender to react to form the aqueous modified polyisocyanate dispersion.

7 Claims, No Drawings

PROCESS FOR PREPARING AND OPTIONALLY CHAIN EXTENDING AQUEOUS POLYISOCYANATE DISPERSIONS USING STATIC MIXERS

BACKGROUND OF THE INVENTION

1. Field of the Invention

The present invention is directed to a process for dispersing a polyisocyanate in an aqueous medium using a static mixer and optionally chain extending the dispersed polyisocyanate using a second static mixer.

2. Description of the Prior Art

U.S. Pat. No. 4,904,522 discloses the use of polyisocyanate dispersions as binders for fiberglass. Copending application, U.S. Ser. No. 07/529,056, filed May 25, 1990, is directed to reducing the isocyanate content of aqueous polyisocyanate dispersions by reacting the dispersed polyisocyanates with monoamines containing at least one hydroxyl group in order to improve their effectiveness as binders for fiberglass. U.S. Pat. No. 5,191,012, is directed to increasing the pot life of aqueous polyisocyanate dispersions by reacting the dispersed polyisocyanates with polyamines in order to encapsulate the dispersed polyisocyanates and reduce their reactivity to water. U.S. Pat. No. 5,185,200, is directed to to an improved method for reducing the isocyanate content of aqueous polyisocyanate dispersions by reacting the dispersed polyisocyanates with both monoamines containing at least one hydroxyl group and polyamines. Copending application, Ser. No. 07/676,678, is directed to the use of the previously disclosed aqueous polyisocyanate dispersions and modified aqueous polyisocyanate dispersions as sealants and primers for concrete, particularly green concrete.

Because the aqueous polyisocyanate dispersions are not stable due to the reaction of the isocyanate groups with water, it is not possible for a manufacturer to prepare the aqueous polyisocyanate dispersions and ship to them to a potential customer. They must be prepared shortly before they are used in their intended application. Since many potential customers do not have the necessary equipment, a need exists for portable dispersing equipment in order to prepare the dispersions for experimental demonstrations, etc.

In addition, when the aqueous polyisocyanate dispersions are used in applications such as the priming and/or sealing of concrete, the need also exists for portable dispersing equipment since the concrete manufacturers must be able to prepare the dispersions at all of the different locations where they apply concrete.

Accordingly, it is an object of the present invention to provide a method of preparing aqueous polyisocyanate dispersions using equipment which is uncomplicated in design and capable of being moved from one location to another. It is a further object of the present invention to also provide equipment which is capable of chain extending the dispersed polyisocyanates.

These objects may be achieved in accordance with the present invention by using static mixers for the dispersion step and the optional chain extending step.

SUMMARY OF THE INVENTION

The present invention is directed to a process for preparing an aqueous polyisocyanate dispersion which has an isocyanate content of at least 0.5% by weight, based on the weight of the polyisocyanate, by a) introducing an aqueous medium into the inlet of a static mixer,
b) introducing a polyisocyanate which has an isocyanate content of at least 12% by weight into the same or a different inlet of the static mixer,
c) mixing the polyisocyanate with the aqueous medium in the static mixer and
d) withdrawing the aqueous polyisocyanate dispersion from the outlet of the static mixer.

The present invention is also directed to a process for preparing an aqueous modified polyisocyanate dispersion which has an isocyanate content of at least 0.5% by weight, based on the weight of the polyisocyanate, by the following additional steps e) introducing the aqueous polyisocyanate dispersion into the inlet of a second static mixer,
f) introducing into the same or a different inlet of the second static mixer a chain extender containing at least one of
  i) a primary or secondary monoamine containing at least one hydroxyl group in an amount sufficient to provide an equivalent ratio of amino groups to isocyanate groups of 0:1.0 to 0.7:1.0 and/or
  ii) a polyamine having primary and/or secondary amino groups and a molecular weight of 400 or less in an amount sufficient to provide an equivalent ratio of amino groups to isocyanate groups of 0:1.0 to 0.4:1.0, provided that when components i) and ii) are both mixed with the dispersed polyisocyanate, the equivalent ratio of amino groups from both components i) and ii) to isocyanate groups does not exceed 0.95:1.0,
g) mixing the chain extender with the aqueous polyisocyanate dispersion in the second static mixer,
h) withdrawing the reacting mixture of the aqueous polyisocyanate dispersion and the chain extender from the outlet of the second static mixer and
i) allowing the polyisocyanate and chain extender to react to form the aqueous modified polyisocyanate dispersion.

DETAILED DESCRIPTION OF THE INVENTION

Suitable polyisocyanates for use in preparing the polyisocyanates to be dispersed in the aqueous medium in the first static mixer in accordance with the present invention include the known aliphatic, cycloaliphatic, araliphatic, aromatic and heterocyclic isocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is not possible to disperse them in water using a static mixer in accordance with the present invention, even if they are hydrophilically modified or dispersed in the presence of an external emulsifier.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethyl-5-isocyanatomethyl cyclohexane (isophorone diisocyanate), 2,4-and/or 2,6-hexahydrotoluylene diisocyanate, hexahydro-1,3-and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts which are dispersed in the aqueous medium in the static mixer in accordance with the present invention may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the modified polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of modified polyisocyanate.

Hydrophilic components having terminal or lateral hydrophilic chains containing ethylene oxide units include compounds corresponding to the formulae

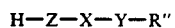

or

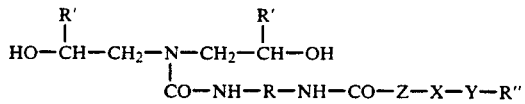

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR'''— wherein R''' has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the polyisocyanates have functionalities of at least 2.

In accordance with the present invention the polyisocyanates are dispersed in water using a static mixer. Prior to entering the static mixer the aqueous medium and polyisocyanates are withdrawn from separate storage containers, optionally filtered and pumped to the static mixer. Suitable pumps are known and include piston, diaphram, gear and centrifugal pumps; piston pumps are preferred.

After passing through the pumps the components preferably pass through known metering apparatus to accurately control the flow rates of the aqueous medium and the polyisocyanate. The components may enter the static mixer through separate inlets or, preferably, the separate feed streams for the components are merged into one stream before entering the static mixer. Suitable static mixers are known and are available from the manufacturers set forth in the Chemical Engineering Equipment Buyers' Guide, published by McGraw-Hill, 1990, August edition, e.g., TAH Industries Inc., Eastern Mixers Inc., Kenics Corp., Luwa Corp and lightning Mixing Equipment Co. Inc.

The flow rate generated by the pumps and the type of static mixer are selected to ensure that sufficient mixing of the polyisocyanate and aqueous medium occurs to form the aqueous polyisocyanate dispersion.

The relative flow rates between the two streams are selected such that the polyisocyanate dispersions have a solids content of about 2 to 50, preferably about 10 to 30 weight percent.

If it is desired to reduce the isocyanate content of the aqueous polyisocyanate dispersions obtained from the outlet of the static mixer, the polyisocyanate dispersions may be mixed with primary or secondary monoamines containing one or two hydroxy groups and/or with polyamines having primary and/or secondary amino groups in a second static mixer and allowed to react. Suitable monoamines include those which correspond to the formula

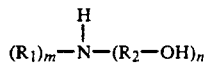

$$(R_1)_m-\overset{H}{\underset{|}{N}}-(R_2-OH)_n$$

wherein
R$_1$ represents hydrogen or an alkyl, cycloalkyl, araliphatic or aromatic group having up to 15 carbon atoms, preferably an alkyl group containing 1 to 6 carbon atoms,
R$_2$ is an optionally branched alkylene group containing 1 to 12, preferably 1 to 4 carbon atoms, m represents 0 or 1, n represents 1 or 2 and $m+n=2$.

Examples of suitable monoamines include ethanolamine, propanolamine, butanolamine, N-methylethanolamine, N-ethylethanolamine, N-propylethanolamine, N-butyl-ethanolamine, N-methylpropanolamine, N-ethyl-propanolamine, N-propylpropanolamine, N-butyl-propanolamine, N-methylbutanolamine, N-ethyl-butanolamine, N-propylbutanolamine, N-butyl-butanolamine, diethanolamine, dipropanolamine, dibutanolamine, and N-ethanol-N-propanolamine. Ethanolamine is especially preferred.

Suitable polyamines for reacting with the aqueously dispersed polyisocyanates are those having a molecular weight of less than about 400 and containing two or more primary and/or secondary amino groups. The amino groups may aliphatically-, cycloaliphatically-, araliphatically- or aromatically-bound. Examples of suitable polyamines include ethylene diamine, 1,3-propane diamine, 1,4-butane diamine, 2-methyl-pentamethylene diamine, N,N'-dimethyl-ethylene diamine, diethylene triamine, triethylene tetraamine, tetraethylene pentamine, pentaethylene hexamine, 1,6-hexane diamine, piperazine, 2,5-dimethyl piperazine, 1-amino-3-aminomethyl-3,5,5-trimethylcyclohexane (isophorone diamine), bis-(4-aminocyclohexyl)methane, bis-(4-amino-3-methylcyclohexyl)-methane, 1,2- and 1,4-cyclohexane diamine, 1,2-propane diamine, hydrazine, aminoacid hydrazides, hydrazides of semicarbazido carboxylic acids, bis-hydrazides, bis-semicarbazides, N,N,N-tris-(2-aminoethyl)-amine, N-(2-piperazinoethyl) ethylene diamine, N,N'-bis-(2-aminoethyl)-piperazine, N,N,N'-tris-(2-aminoethyl)-ethylene diamine, N-[N-(2-aminoethyl)-2-amino-ethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylene pentamine, tripropylene tetramine, N,N-bis-(6-aminohexyl)-amine, N,N'-bis-(3-aminopropyl)-ethylene diamine, 2,4-bis-(4'-aminobenzyl)-aniline, diethyl-toluene diamine isomers, toluene diamine isomers, 1,3-phenylene diamine, methylene-bis-(phenylamine) isomers, 1,5-naphthalene diamine, aniline, alkyl anilines, toluidine, t-butyl-toluene diamine isomers, methylene-bis-(o-dichloroaniline) (MOCA), 2,4-diaminoalkylbenzene isomers having 8 to 15 carbon atoms in the alkyl chain and mixtures of these polyamines.

Preferred polyamines include ethylene diamine, 1,3-propane diamine, 1,4-butane diamine, 2-methyl-pentamethylene diamine, N,N'-dimethyl-ethylene diamine, diethylene triamine, 1,6-hexane diamine, piperazine, 1-amino-3-aminomethyl-3,5,5-trimethylcyclohexane (isophorone diamine), bis-(4-aminocyclohexyl)methane, 1,2- and 1,4-cyclohexane diamine, 1,2-propane diamine, hydrazine, diethyl-toluene diamine isomers, 1,3-phenylene diamine and mixtures thereof.

The advantage obtained by reacting the dispersed polyisocyanate with the monoamine containing one or two hydroxyl groups as disclosed in copending application, U.S. Ser. No. 07/529,056, filed May 25, 1990 (herein incorporated by reference), is to reduce the isocyanate content of the aqueous polyisocyanate dispersions by reacting the dispersed polyisocyanates. Such a modification may be necessary in accordance with the present invention depending upon the intended use for the end product.

The advantage obtained by reacting the dispersed polyisocyanate with a polyamine as disclosed in U.S. Pat. No. 5,191,012 (herein incorporated by reference), is to increase the pot life of the aqueous polyisocyanate dispersions by encapsulating the dispersed polyisocyanates and reducing their reactivity to water. If it is not possible use the aqueous polyisocyanate dispersions to for their intended application within a short time after dispersing the polyisocyanate in water, the reaction with the polyamine would be beneficial in accordance with the present invention.

The advantage of reacting the dispersed polyisocyanates with both monoamines and polyamines is disclosed in U.S. Pat. No. 5,185,200 (herein incorporated by reference). By reacting the dispersed polyisocyanates with both a monoamine and polyamine the isocyanate content of the modified polyisocyanates can be further reduced without forming non-flowable gels.

If the optional monoamines and/or polyamines are reacted with the dispersed polyisocyanates in accordance with the present invention, they are mixed with the aqueous polyisocyanate dispersion in a second static mixer. If the dispersed polyisocyanate is to be modified with both a monoamine and polyamine, the monoamine and polyamine are preferably pre-mixed before they are introduced into the second static mixer. If the monoamine is added prior to the polyamine, then a third static mixer would be necessary for introducing the polyamine. It is not recommended to add the polyamine before the monoamine because the polyamine will encapsulate the polyisocyanate making further reaction with the monoamine difficult because the monoamine will have to migrate to the inside of the encapsulated, dispersed polyisocyanate particle. If the polyamine is added in an amount that is less than the amount required to encapsulate all of the dispersed polyisocyanate particles, it is possible to add the polyamine before the monoamine; however, this is not recommended.

The amount of the optional monoamine containing one or two hydroxyl groups is chosen to provide an equivalent ratio of amino groups to isocyanate groups of the polyisocyanate of 0:1.0 to 0.7:1.0, preferably 0.1:1.0 to 0.7:1.0 and more preferably 0.2:1.0 to 0.6:1.0. The amount of the optional polyamine is chosen to provide an equivalent ratio of amino groups to isocyanate groups of 0:1.0 to 0.4:1.0, preferably 0.1:1.0 to 0.4:1.0 and preferably 0.15:1.0 to 0.35:1.0. The amounts of monoamine and polyamine are also chosen to ensure that the equivalent ratio of the total amount of amino groups to isocyanate groups does not exceed 0.95:1.0.

If the dispersed polyisocyanate is to be modified with both a monoamine and polyamine in accordance with the present invention, it is possible to obtain a dispersed, modified polyisocyanate which has a low free isocyanate content and which does not form a viscous mass which is not longer flowable and which cannot be reliquified. The aqueous dispersion of the modified polyisocyanate is obtained in the form of a liquid or in the form of a non-flowable solid which can be reliquified with mild agitation.

The maximum amount of the monoamine and polyamine which may optionally be reacted with the dispersed polyisocyanate in accordance with the present invention depends upon the solids content of the polyisocyanate dispersion. At a solids content of 10% by weight a maximum amount of 35% of the isocyanate groups may be reacted with the amino groups of the monoamine and a maximum of 25% of the isocyanate groups may be reacted with the polyamine to produce the modified polyisocyanate. At a solids content of 5% by weight a maximum amount of 50% of the isocyanate groups may be reacted with the amino groups of the monoamine and a maximum of 30% of the isocyanate groups may be reacted with the polyamine to produce the modified polyisocyanate.

When the polyisocyanate dispersion has an even lower solids content, the maximum percentage of the isocyanate groups which can be reacted can be further increased; however, preferably a sufficient percentage of the isocyanate groups react with the polyamine to ensure that the modified polyisocyanate is in the form of a liquid or in the form of a non-flowable solid which can be reliquified.

The amount of the polyamine which is necessary to ensure that the modified polyisocyanate is either liquid or a non-flowable solid which can be reliquified is dependent upon the solids content of the polyisocyanate dispersion and upon the particular polyamine which is reacted with the polyisocyanate. For example, more ethylene diamine can be reacted with the polyisocyanate before it is encapsulated than 2-methyl-pentamethylene diamine.

In accordance with the present invention it is important not to react all of the isocyanate groups prior to using the low NCO content polyisocyanate dispersions for their intended applications. If all of the isocyanate groups have been reacted prior to this step, then the polyisocyanate is no longer film forming. Accordingly, prior to using the polyisocyanate dispersions for their intended application, the NCO content should be at least 0.5%, preferably at least 1.0% by weight, based on the weight of the modified polyisocyanate.

If the dispersed polyisocyanate is to be modified with both a monoamine and polyamine in accordance with the present invention and the polyisocyanate dispersion is to be used in its intended application immediately after the addition of the monoamine and polyamine, i.e., within 10 to 20 minutes, then the upper limit of chain extender to be added is an amount sufficient to provide an equivalent ratio of amino groups to isocyanate groups of about 0.95:1.0. This is because the hydroxyl groups of the monoamine will not have sufficient time to react with the isocyanate groups before the dispersed polyisocyanate is used for its intended application, thus ensuring a sufficient NCO content to provide a film-forming polyisocyanate. To the contrary, if it will be more than 20 minutes after the addition of the chain extender before the polyisocyanate dispersion is to be used for its intended application, then lesser amounts of the chain extender should be used so that the isocyanate content will be at least 0.5% by weight as previously discussed. While, it is preferred to use the dispersed, optionally modified polyisocyanate for its intended application within 10 to 20 minutes after the addition of the chain extender, this is not always possible. However, in accordance with the present invention it is possible to extend this time period from a few hours to several days by reacting the dispersed polyisocyanate with a polyamine in order to encapsulate the polyisocyanate and reduce its reactivity with water.

The monoamines and/or polyamines are mixed with the aqueous polyisocyanate dispersions in the second static mixer in the same manner as the polyisocyanates are dispersed in water using the first static mixer, i.e., the preparation of the streams prior to entering the static mixer and selection of pumps and static mixers are as previously set forth. The components may enter the static mixer through separate inlets or, preferably, the separate feed streams for the components are merged into one stream before entering the static mixer.

The flow rate generated by the pumps and the type of static mixer are selected to ensure that sufficient mixing of the chain extender and aqueous polyisocyanate dispersion occurs.

The relative flow rates between the two streams are selected such that the previously discussed equivalent ratios of isocyanate groups to amino groups are maintained.

The aqueous, optionally modified polyisocyanate dispersions generally have a viscosity of about 5 to 5000, preferably 20 to 1000 mPa.s when they are used for their intended application. Higher viscosities are not recommended because the aqueous polyisocyanate dispersions may not be suitable for their intended purpose.

In accordance with the present invention, it is also possible to incorporate additives into the polyisocyanate emulsions. The additives may be present in the form of a solution or in the form of an emulsion or dispersion. These additives are known and include catalysts such as tertiary amines, silaamines having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The invention is further illustrated but is not intended to be limited by the following examples in which all parts and percentages are by weight unless otherwise specified.

EXAMPLES

The dispersions in the examples below were prepared in a multi-stream dispersing/mixing apparatus. The components were pumped through 9.5 mm I.D. tubing using positive displacement piston metering pumps. The dispersing and mixing were accomplished in two TAH Industries Inc. static mixers of identical design having a length of 0.47 meters, an inside diameter of 26.9 mm and 12 mixing elements each.

EXAMPLE 1

Preparation of an Aqueous Polyisocyanate Dispersion

A dispersion was prepared using a modified polyisocyanate based on "crude MDI" and a monofunctional poly(oxyethylene) ether. The modified polyisocyanate had an isocyanate content of 20.4%. It was supplied at a rate of 6038 gram/minute. The polyisocyanate stream was combined with a water stream, which was pumped at a rate of 38,136 gram/minute, just prior to entering the inlet of the previously described static mixer. The water was metered using a high capacity positive displacement piston pump. The material exiting the static mixer was an off white dispersion having a pH of 7 and a viscosity of about 10 mPa.s at 25° C. The solids content of the dispersion was about 14%.

EXAMPLE 2

Preparation of a Partially Chain Extended Aqueous Polyisocyanate Dispersion

A dispersion was prepared from the following materials using the indicated flow rates:

| | |
|---|---|
| Modified polyisocyanate from Ex. 1 | 700 grams/min. |
| Water | 8,655 grams/min. |
| Aqueous ethanolamine (15% solution) | 692 grams/min. |

The polyisocyanate and water were combined to form a dispersion as in Example 1. The dispersion exiting the static mixer was combined with the aqueous ethanolamine stream just prior to entering the inlet of a second static mixer. The equivalent ratio of amino groups was 0.5:1. The material exiting the second static mixer was a partially chain extended, aqueous polyisocyanate dispersion. At the exit of the second static mixer the viscosity of the dispersion was less than 100 mPa.s at 25° C. Within 30 seconds the viscosity of a sample of the dispersion collected in a glass jar was about 5000 mPa.s at 5° C., and it had a pH of about 7. The viscosity increased rapidly over a period of approximately one minute to provide a dispersion that would not flow. The solids content of the dispersion was about 8%. Even though the viscosity of the mixture increased rapidly, the viscosity of the dispersion at the exit of the second static mixer was suitable for spray applications which require rapid curing.

EXAMPLE 3

Preparation of a Partially Chain Extended Aqueous Polyisocyanate Dispersion

A dispersion was prepared from the following materials using the indicated flow rates:

| | |
|---|---|
| Modified polyisocyanate from Ex. 1 | 939 grams/min. |
| Water | 10,896 grams/min. |
| Aqueous chain extender (15% solution) | 700 grams/min. |

The polyisocyanate and water were combined to form a dispersion as in Example 1. The dispersion exiting the static mixer was combined with the aqueous chain extender stream just prior to entering the inlet of a second static mixer. The chain extender solution comprised a mixture of ethylene diamine and ethanolamine at an amine equivalent ratio of 1:1, which was diluted to 15% solids with water. This corresponded to an equivalent ratio of amino groups to isocyanate groups of 0.5:1. The material exiting the second static mixer was a partially chain extended, aqueous polyisocyanate dispersion. The viscosity of the dispersion was about 700 mPa.s at 25° C., and it had a pH of about 6.9. The solids content of the dispersion was 8%.

EXAMPLE 4

Preparation of a Partially Chain Extended Aqueous Polyisocyanate Dispersion

A dispersion was prepared from the following materials using the indicated flow rates:

| | |
|---|---|
| Modified polyisocyanate from Ex. 1 | 6,038 grams/min. |
| Water | 25,207 grams/min. |
| Aqueous ethylene diamine (15% solution) | 1,758 grams/min. |

The polyisocyanate and water were combined to form a dispersion as in Example 1. The dispersion exiting the static mixer was combined with the aqueous ethylene diamine stream just prior to entering the inlet of a second static mixer. The equivalent ratio of amino groups to isocyanate groups was 0.3:1. The material exiting the second static mixer was a partially chain extended aqueous polyisocyanate dispersion. The initial viscosity of the dispersion was about 25 mPa.s at 25° C, and it had a pH of about 7.5. The solids content of the dispersion was about 20%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing an aqueous, polyisocyanate dispersion which has an isocyanate content of at least 0.5% by weight, based on the weight of the polyisocyanate, and is prepared by a process which comprises
   a) introducing an aqueous medium into an inlet of a static mixer,
   b) introducing a polyisocyanate which has an isocyanate content of at least 12% by weight into the same or a different inlet of said static mixer,
   c) mixing said polyisocyanate with said aqueous medium in said static mixer,
   d) withdrawing said aqueous polyisocyanate dispersion from the outlet of said static mixer,
   e) introducing said aqueous polyisocyanate dispersion into the inlet of a second static mixer,
   f) introducing into the same or a different inlet of said second static mixer a chain extender containing at least one of
      i) a primary or secondary monoamine containing at least one hydroxyl group in an amount sufficient to provide an equivalent ratio of amino groups to isocyanate groups of 0.1:1.0 to 0.7:1.0 and
      ii) a polyamine having primary and/or secondary amino groups and a molecular weight of 400 or less in an amount sufficient to provide an equivalent ratio of amino groups to isocyanate groups of 0.1:1.0 to 0.4:1.0, provided that when components i) and ii) are both mixed with the dispersed polyisocyanate, the equivalent ratio of amino groups from both components i) and ii) to isocyanate groups does not exceed 0.95:1.0,
   g) mixing said chain extender with said aqueous polyisocyanate dispersion in said second static mixer,
   h) withdrawing the reacting mixture of said aqueous polyisocyanate dispersion and said chain extender from the outlet of said second static mixer and
   i) forming a film of the reacting mixture while the NCO content is at least 0.5% by weight.

2. The process of claim 1 wherein said dispersed polyisocyanate is rendered hydrophilic by reaction with a compound containing a lateral or terminal nonionic hydrophilic group.

3. The process of claim 1 wherein said chain extender comprises a primary or secondary monoamine which corresponds to the formula

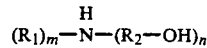

wherein
   $R_1$ represents hydrogen or an alkyl, cycloalkyl, araliphatic or aromatic group having up to 15 carbon atoms,
   $R_2$ is an optionally branched alkylene group containing 1 to 12 carbon atoms, m represents 0 or 1, n represents 1 or 2 and
   $m+n=2$.

4. The process of claim 3 wherein
   $R_1$ is an alkyl group containing 1 to 6 carbon atoms and
   $R_2$ is an optionally branched alkylene group containing 1 to 4 carbon atoms.

5. A process for preparing an aqueous, polyisocyanate dispersion which has a functionality of at least 2 and an isocyanate content of at least 1.0% by weight, based on the weight of the polyisocyanate, and is prepared by a process which comprises
   a) introducing an aqueous medium into an inlet of a static mixer,
   b) introducing into the same or a different inlet of said static mixer a polyisocyanate which has an isocyanate content of at least 12% by weight and is rendered hydrophilic by reaction with a compound containing a lateral or terminal nonionic hydrophilic groups,
   c) mixing said polyisocyanate with said aqueous medium in said static mixer,
   d) withdrawing said aqueous polyisocyanate dispersion from the outlet of said static mixer,
   e) introducing said aqueous polyisocyanate dispersion into the inlet of a second static mixer,
   f) introducing into the same or a different inlet of said second static mixer a chain extender containing at least one of
      i) a primary or secondary monoamine containing at least one hydroxyl group in an amount sufficient to provide an equivalent ratio of amino groups to isocyanate groups of 0.1:1.0 to 0.7:1.0 and
      ii) a polyamine having primary and/or secondary amino groups and a molecular weight of 400 or less in an amount sufficient to provide an equivalent ratio of amino groups to isocyanate groups of 0.1:1.0 to 0.4:1.0, provided that when components i) and ii) are both mixed with the dispersed polyisocyanate, the equivalent ratio of amino groups from both components i) and ii) to isocyanate groups does not exceed 0.95:1.0,
   g) mixing said chain extender with said aqueous polyisocyanate dispersion in said second static mixer,
   h) withdrawing the reacting mixture of said aqueous polyisocyanate dispersion and said chain extender from the outlet of said second static mixer and
   i) forming a film of the reacting mixture while the NCO content is at least 1.0% by weight.

6. The process of claim 5 wherein said chain extender comprises a primary or secondary monoamine which corresponds to the formula

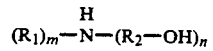

wherein
   $R_1$ represents hydrogen or an alkyl, cycloalkyl, araliphatic or aromatic group having up to 15 carbon atoms,
   $R_2$ is an optionally branched alkylene group containing 1 to 12 carbon atoms, m represents 0 or 1, n represents 1 or 2 and
   $m+n=2$.

7. The process of claim 6 wherein
   $R_1$ is an alkyl group containing 1 to 6 carbon atoms and
   $R_2$ is an optionally branched alkylene group containing 1 to 4 carbon atoms.